US012811654B2

(12) United States Patent
Ren et al.

(10) Patent No.: US 12,811,654 B2
(45) Date of Patent: Nov. 24, 2026

(54) METHOD AND APPARATUS FOR TRANSMITTING CHANNEL STATE INFORMATION, TERMINAL, AND NETWORK-SIDE DEVICE

(71) Applicant: VIVO MOBILE COMMUNICATION CO., LTD., Guangdong (CN)

(72) Inventors: Qianyao Ren, Guangdong (CN); Yang Song, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 198 days.

(21) Appl. No.: 18/651,137

(22) Filed: Apr. 30, 2024

(65) Prior Publication Data

US 2024/0283515 A1 Aug. 22, 2024

Related U.S. Application Data

(63) Continuation of application No. PCT/CN2022/129471, filed on Nov. 3, 2022.

(30) Foreign Application Priority Data

Nov. 5, 2021 (CN) ......................... 202111308574.1

(51) Int. Cl.
*H04B 7/06* (2006.01)

(52) U.S. Cl.
CPC ......... *H04B 7/0639* (2013.01); *H04B 7/0626* (2013.01)

(58) Field of Classification Search
CPC .. H04B 7/0636; H04B 7/0626; H04B 7/0456; H04B 7/046; H04B 7/0617; H04B 7/0634
See application file for complete search history.

(56) References Cited

U.S. PATENT DOCUMENTS 11,936,456 B2 * 3/2024 Grossmann .......... H04B 7/0626
12,356,448 B2 * 7/2025 Wu ...................... H04B 7/0639
(Continued)

FOREIGN PATENT DOCUMENTS

CN 111566946 A 8/2020
CN 112398518 A 2/2021
(Continued)

OTHER PUBLICATIONS

European Search Report for Application No. 22889351.7, mailed Feb. 6, 2025, 11 pages.
(Continued)

*Primary Examiner* — Iqbal Zaidi
(74) *Attorney, Agent, or Firm* — Foley & Lardner LLP

(57) ABSTRACT

A method and apparatus for transmitting channel state information, a terminal and a network-side device. A method for transmitting channel state information executed by a terminal includes: reporting channel state information to the network-side device. The channel state information includes a first part and a second part. The first part includes a total number of non-zero coefficients in a precoding matrix indicator PMI, the second part at least includes a second group, the second group includes non-zero coefficients of m ports corresponding to a first polarization direction and non-zero coefficients of n ports corresponding to a second polarization direction, and both m and n are positive integers. The technical solutions of the embodiments of this application can ensure the precoding effect of the network-side device.

17 Claims, 5 Drawing Sheets

(56) References Cited

U.S. PATENT DOCUMENTS

| | | | |
|---|---|---|---|
| 2019/0229791 A1 | 7/2019 | Song et al. | |
| 2021/0075487 A1 | 3/2021 | Rahman et al. | |
| 2022/0240255 A1 | 7/2022 | Matsumura et al. | |
| 2022/0263560 A1 | 8/2022 | Cai et al. | |
| 2022/0385343 A1* | 12/2022 | Cai ...................... | H04B 7/0626 |

FOREIGN PATENT DOCUMENTS

| | | | |
|---|---|---|---|
| CN | 112751592 | A | 5/2021 |
| WO | 2020172768 | A1 | 9/2020 |
| WO | 2020220371 | A1 | 11/2020 |
| WO | 2020250289 | A1 | 12/2020 |

OTHER PUBLICATIONS

Written Opinion for PCT Application PCT/CN2022/129471 Mailed Jan. 17, 2023. 15 pages.

First Japanese Office Action for Japanese Application No. 2024-525988 mailed Mar. 17, 2025. 11 pages.

* cited by examiner

METHOD AND APPARATUS FOR TRANSMITTING CHANNEL STATE INFORMATION, TERMINAL, AND NETWORK-SIDE DEVICE

CROSS-REFERENCE TO RELATED APPLICATIONS

This application is a continuation of International Application No. PCT/CN2022/129471 filed on Nov. 3, 2022, which claims priority to Chinese Patent Application No. 202111308574.1 filed on Nov. 5, 2021, which are incorporated herein by reference in their entireties.

TECHNICAL FIELD

This application belongs to the technical field of communication, and in particular relates to a method and apparatus for transmitting channel state information, a terminal and a network-side device.

BACKGROUND

Compared with the previous mobile communication systems, the 5th generation mobile communication (5G) system needs to be adapted to more diversified scenarios and service requirements. For example, main application scenarios of 5G systems include enhanced mobile broadband (eMBB), massive machine type of communication (mMTC), and ultra reliable & low latency communication (URLLC) and other services. These services raise requirements, such as high reliability, low latency, large bandwidth, and broad coverage, for the 5G systems.

Through channel state information (CSI), the CSI of the communication systems can adapt to current channel conditions, providing assurance for high-reliability and high-rate communication in multi-antenna systems. Reported content includes: rank indicator (RI), channel quality indicator (CQI), layer indicator (LI), precoding matrix indicator (PMI), etc. The accuracy of the PMI will influence the precoding effect of the network-side device.

SUMMARY

Embodiments of this application provide a method and apparatus for transmitting channel state information, a terminal and a network-side device.

According to a first aspect, an embodiment of this application provides a method for transmitting channel state information executed by a terminal, including:

reporting channel state information to a network-side device, the channel state information including a first part and a second part, the first part including a total number of non-zero coefficients in a precoding matrix indicator PMI, the second part at least including a second group, the second group including non-zero coefficients of m ports corresponding to a first polarization direction and non-zero coefficients of n ports corresponding to a second polarization direction, and both m and n being positive integers.

According to a second aspect, an embodiment of this application provides a method for transmitting channel state information executed by a network-side device, including:

receiving channel state information reported by a terminal, the channel state information including a first part and a second part, the first part including a total number of non-zero coefficients in a precoding matrix indicator PMI, the second part at least including a second group, the second group including non-zero coefficients of m ports corresponding to a first polarization direction and non-zero coefficients of n ports corresponding to a second polarization direction, and both m and n being positive integers.

According to a third aspect, an embodiment of this application provides an apparatus for transmitting channel state information applied to a terminal, including:

a reporting module configured to report channel state information to a network-side device, the channel state information including a first part and a second part, the first part including a total number of non-zero coefficients in a precoding matrix indicator PMI, the second part at least including a second group, the second group including non-zero coefficients of m ports corresponding to a first polarization direction and non-zero coefficients of n ports corresponding to a second polarization direction, and both m and n being positive integers.

According to a fourth aspect, an embodiment of this application provides an apparatus for transmitting channel state information applied to a network-side device, including:

a receiving module configured to receive channel state information reported by a terminal, the channel state information including a first part and a second part, the first part including a total number of non-zero coefficients in a precoding matrix indicator PMI, the second part at least including a second group, the second group including non-zero coefficients of m ports corresponding to a first polarization direction and non-zero coefficients of n ports corresponding to a second polarization direction, and both m and n being positive integers.

According to a fifth aspect, an embodiment of this application provides a terminal including a processor, a memory, and a program or instruction stored in the memory and runnable on the processor, the program or instruction, when executed by the processor, implementing steps of the method according to the first aspect.

According to a sixth aspect, an embodiment of this application provides a terminal, including a processor and a communication interface, where the processor is configured to measure a positioning reference signal PRS, the communication interface is configured to report channel state information to a network-side device, the channel state information includes a first part and a second part, the first part includes a total number of non-zero coefficients in a precoding matrix indicator PMI, the second part at least includes a second group, the second group includes non-zero coefficients of m ports corresponding to a first polarization direction and non-zero coefficients of n ports corresponding to a second polarization direction, and both m and n are positive integers.

According to a seventh aspect, an embodiment of this application provides a network-side device, including a processor, a memory, and a program or instruction stored in the memory and runnable on the processor, the program or instruction, when executed by the processor, implementing steps of the method according to the second aspect.

According to an eighth aspect, an embodiment of this application provides a network-side device, including a processor and a communication interface, where the communication interface is configured to receive channel state information reported by a terminal, the channel state information includes a first part and a second part, the first part includes a total number of non-zero coefficients in a precoding matrix indicator PMI, the second part at least includes a second group, the second group includes non-zero coefficients of m ports corresponding to a first polarization direction and non-zero coefficients of n ports corresponding to a second polarization direction, and both m and n are positive integers.

According to a ninth aspect, an embodiment of this application provides a readable storage medium storing a program or instruction, the program or instruction, when executed by a processor, implementing steps of the method according to the first aspect or steps of the method according to the second aspect.

According to a tenth aspect, an embodiment of this application provides a chip including a processor and a communication interface coupled to the processor, the processor being configured to run a program or instruction to implement the method according to the first aspect or the method according to the second aspect.

According to an eleventh aspect, an embodiment of this application provides a computer program/program product stored in a non-volatile storage medium and configured to be executed by at least one processor to implement steps of the method according to the first aspect or the second aspect.

DETAILED DESCRIPTION

The technical solutions in the embodiments of this application will be clearly described below with reference to the drawings in the embodiments of this application. Apparently, the described embodiments are merely some rather than all of the embodiments of this application. All other embodiments obtained by a person skilled in the art based on the embodiments of this application still fall within the scope of protection of this application.

Terms such as "first" and "second" in the description and claims of this application are used for distinguishing similar objects, instead of describing a specific order or sequence. It is to be understood that terms used in this way are exchangeable in a proper case, so that the embodiments of this application can be implemented in an order different from the order shown or described herein; and the objects distinguished by "first" and "second" are usually of the same class and do not limit the number of the objects; for example, the number of first objects may be one or more. In addition, "and/or" in the description and claims represents at least one of the connected objects. Character "/" generally represents an "or" relationship between the associated objects.

It is worth pointing out that the technologies described in the embodiments of this application are not limited to the long term evolution (LTE)/LTE-advanced (LTE-A) system, and may further be applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application can be usually exchanged in use. The technologies described not only can be applied to the systems and radio technologies mentioned above, and but also can be applied to other systems and radio technologies. However, the following description describes a new radio (NR) system for example purposes and uses NR terminology in most of the following description, although these technologies can also be applied to applications outside of NR system applications, such as $6^{th}$ generation (6G) communication systems.

Figure 1:
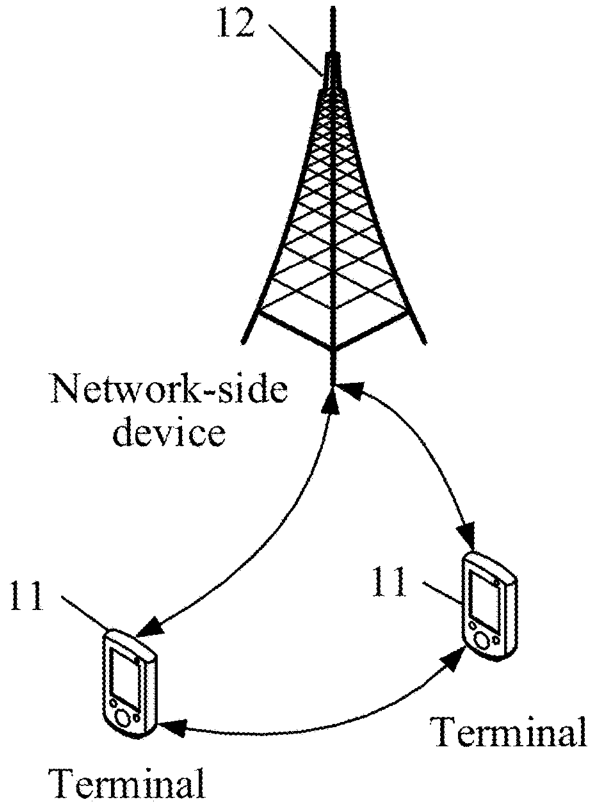
FIG. 1 is a schematic diagram of a wireless communication system.

FIG. 1 is a block diagram of a wireless communication system applicable in an embodiment of this application. The wireless communication system includes terminals 11 and a network-side device 12. Each terminal 11 may be referred to as terminal equipment or user equipment (UE). The terminal 11 may be a terminal-side device such as a mobile phone, a tablet personal computer, a laptop computer or referred to as a laptop, a personal digital assistant (PDA), a hand-held computer, a netbook, an ultra-mobile personal computer (UMPC), a mobile Internet device (MID), a wearable device, vehicle user equipment (VUE), or a pedestrian user equipment (PUE). The wearable device includes: a smart watch, a wristband, an earphone, glasses, etc. It is to be understood that the specific type of the terminal 11 is not limited in this embodiment of this application. The network-side device 12 may be a base station or core network. The base station may be referred to as a node B, an evolution node B, an access point, a base transceiver station (BTS), a radio base station, a radio transceiver, a basic service set (BSS), an extended service set (ESS), a B node, an evolved node B (eNB), a home B node, home evolved node B, a WLAN access point, a WiFi node, a transmitting receiving point (TRP), or some other suitable term in the art, as long as the same technical effect is achieved. The base station is not limited to specific technical terms. It is to be understood that in this embodiment of this application, only the base station in the NR system is taken as an example, but the specific type of the base station is not limited. The core network device may be a location management device, such as a location management function (LMF), or an evolved serving mobile location centre (E-SMLC).

In order to report accurate PMI without increasing too much CSI overhead, the Type II codebook divides the PMI into several parts and reports them separately to reduce the overhead.

The PMI of the Enhanced Type II codebook mainly includes W1, W2, and Wf, where W1 represents a port selection result or an orthogonal basis selection result, Wf represents a frequency domain selection result or a delay tap selection result, and W2 is a specific coefficient. A bitmap indicates the location of non-zero coefficients. A strongest coefficient indicator (SCI) indicates the location of the strongest coefficient.

The CSI feedback content can be divided into two parts, namely CSI first part (Part1) and CSI second part (Part2). For the Enhanced Type II codebook, CSI Part1 includes the number of non-zero coefficients in CRI, RI, CQI and PMI. CSI Part2 can be divided into three groups, namely a first group (group0), a second group (group1) and a third group (group2), where group0 includes port indicator ($i_{1,1}$) and an SCI ($i_{1,8,1}$), group1 includes a polarization amplitude quantization result ($i_{2,3,1}$), a frequency domain (FD) indicator ($i_{1,5}$, $i_{1,6}$), and an amplitude $i_{2,4,1}$ and phase $i_{2,5,1}$ of high-priority coefficients of Floor [$K^{NZ}$/2]-v (the maximum amplitude coefficient of each layer does not need to be reported), where v represents the number of layers reported, and a bit ($i_{1,7,1}$) of a high-priority bitmap of v*2LMv-Floor [$K^{NZ}$/2], and group2 includes an amplitude and phase of low-priority coefficients of Floor [$K^{NZ}$/2], and a bit of a low-priority bitmap of Floor [$K^{NZ}$/2], where Floor represents rounding down, which may also be substituted with $\lfloor * \rfloor$; that is, * in $\lfloor * \rfloor$ is substituted with $K^{NZ}$/2, which is equivalent to Floor [$K^{NZ}$/2].

When CSI Part2 is transmitted on the physical uplink shared channel (PUSCH), UE can ignore a part of content of Part2 based on the priority of the information. Priorities of different information are different. Priorities of $i_{1,7,1}$, $i_{2,4,1}$, and $i_{2,5,1}$ in group1 and group2 are calculated according to the following priority calculation formula:

$$Pri(l, i, f) = 2*L*v*\pi(f) + v*i + l)$$

$$\pi(f) = \min\left(2*n_{3,l}^{(f)}, 2*\left(N_3 - n_{3,l}^{(f)}\right) - 1\right)$$

where Pri is the priority, i is the index (index) of 2*L, L is the number of beams, 1 is the index of layer, f is the index of Mv, and My is the number of FD vectors. The smaller the priority coefficient, the higher the priority. The function of π(f) is to make priorities of delay points closer to tap0 higher, i.e., 0, −1, 1, −2, 2 . . . . The entire priority order is sequentially delay, beam and layer from outside to inside according to the cycle. The purpose of setting priority is to avoid discarding all information in a certain direction as much as possible when discarding, and simultaneously retain more important information.

In the existing priority ordering methods, only the relationship between delay and beam is considered, without distinguishing the polarization within a beam. In other words, the beam in the first polarization direction will be arranged in the first half, and the beam in the second polarization direction will be arranged in the second half, where one port carries one beam. In a case that the number of delay is 1, the low-priority non-zero coefficients are the last half of all coefficients, corresponding exactly to all ports in the second polarization direction, and are placed in the third group. When uplink control information (UCI) omission is transmitted, the third group being discarded first may cause all non-zero coefficients of the ports in the second polarization direction to be discarded, thus influencing the precoding effect of the base station.

Figure 2:
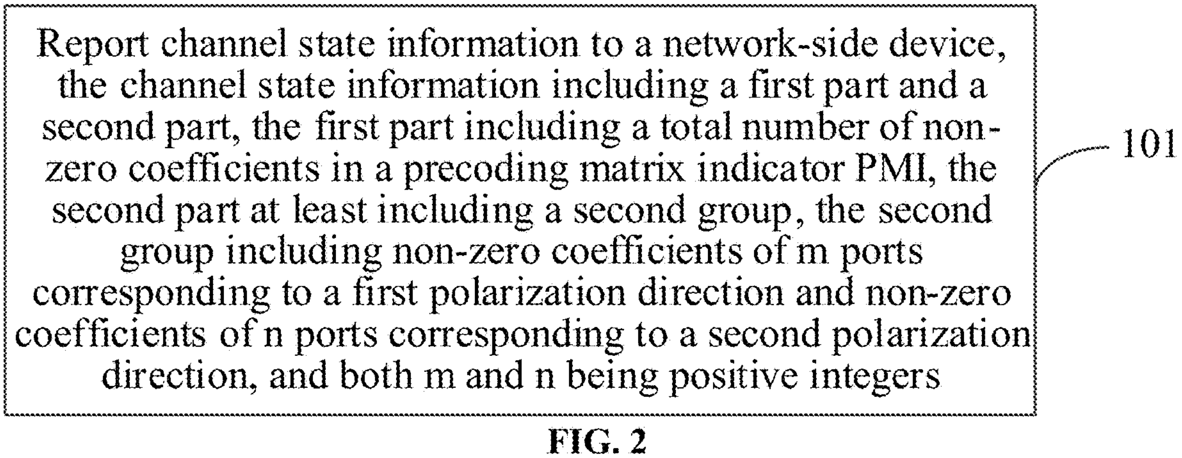
FIG. 2 is a schematic flowchart of a method for transmitting channel state information executed by a terminal according to an embodiment of this application.

An embodiment of this application provides a method for transmitting channel state information. As shown in FIG. 2, the method includes the following steps:

In step 101, channel state information is reported to a network-side device. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers.

In this embodiment of this application, the channel state information includes a first part and a second part, the first part includes the total number of non-zero coefficients in PMI, the second part at least includes a first group and a second group and may further include a third group, a transmission priority of the first group is higher than a transmission priority of the second group, the priority of the second group is higher than a priority of the third group, and the second group not only includes non-zero coefficients of at least one port corresponding to the first polarization direction, but also includes non-zero coefficients of at least one port corresponding to the second polarization direction, so that after the channel state information is reported, even if the third group is discarded, the network-side device can still acquire information about ports in the two polarization directions, thus ensuring the precoding effect of the base station.

In some embodiments, before reporting the channel state information to the network-side device, the method further includes:

- acquiring a first port sequence, the first port sequence including a first port set and a second port set, the first port set including M ports corresponding to a first polarization direction, the second port set including N ports corresponding to a second polarization direction, both M and N being positive integers greater than or equal to 2, and the M ports being arranged before the N ports in the first port sequence;
- reordering the first port sequence to obtain a second port sequence, where at least one of the N ports is arranged at first M bits of the second port sequence; and
- determining m and n based on the second port sequence, M being greater than or equal to m, and N being greater than or equal to n.

In a specific embodiment, the first port set includes X port bundles, each port bundle of the X port bundles includes at least one port, such as $m_1$ ports, corresponding to the first polarization direction, and X is an integer less than or equal to M and greater than or equal to 2; the second port set includes Y port bundles, each port bundle of the Y port bundles includes at least one port, such as $m_1$ ports, corresponding to the second polarization direction, and Y is an integer less than or equal to N and greater than or equal to 2; and the X port bundles and the Y port bundles are arranged alternately in the second port sequence.

Before reporting the channel state information to the network-side device, the first port sequence may be reordered according to a preset ordering method, so that in the second port sequence, a first port bundle and a second port bundle are arranged alternately. The first port bundle is one of the X port bundles. The second port bundle is one of the Y port bundles. The first port bundle includes $m_1$ ports in the first polarization direction, and the second port bundle includes $m_1$ ports in the second polarization direction, where $m_1$ is a positive integer. The priorities of the ordered second port sequence are calculated. In the priority queue after the ports are ordered according to the priorities, at least one of the M ports is arranged before at least one of the N ports.

In a specific example, M and N are equal and are equal to $m_2$. Ports are divided into bundles with a length less than $m_2$. Each bundle may include $m_1$ ports, where $m_1$ is a positive integer. For example, originally the first polarization direction includes port0, port1, port2, and port3; the second polarization direction includes port4, port5, port6, and port7. In the first port sequence, the order of the ports is: port0, port1, port2, port3, port4, port5, port6, port7. PortO and port4 are dual-polarized ports corresponding to the same beam selected by a terminal, port1 and port5 are dual-polarized ports corresponding to the same beam selected by the terminal, and so on. In a specific example, $m_1$ is 2, the first port bundle includes 2 first ports, and the second port bundle includes 2 second ports. After the ports are reordered, the order of the ports in the second port sequence is: port0, port1, port4, port5, port2, port3, port6, port7, where port0 and port1 belong to the same first port bundle, port4 and port5 belong to the same second port bundle, port2 and port3 belong to the same first port bundle, and port6 and port7 belong to the same second port bundle, that is, the ports are ordered according to the first port bundle and the second port bundle. In another specific example, $m_1$ is 1, the first port bundle includes 1 first port, and the second port bundle includes 1 second port. After the ports are reordered, the order of the ports in the second port sequence is: port0, port4, port1, port5, port2, port6, port3, port7, where port0, port1, port2 and port3 belong to the first port bundle, respectively, and port4, port5, port6 and port7 belong to the second port bundle, respectively.

After the ports are ordered, indexes are reassigned to the ports, where the indexes in the port queue after the ports are ordered are related to the initial indexes of the ports, $m_1$ and $m_2$.

In a specific example, the following formula can be used to calculate the indexes in the port queue after the ports are ordered:

$$i_{new} = \left\lfloor \frac{\text{mod}(i_{old}, m_2)}{m_1} \right\rfloor * 2 * m_1 + \left\lfloor \frac{i_{old}}{m_2} \right\rfloor * m_1 + \text{mod}(i_{old}, m_1);$$

where $i_{new}$ is an index of a port after ordering in the second port queue, and $i_{old}$ is an index of the port before ordering in the first port queue. For example, in a case that the order of the ports before ordering is port0, port1, port2, port3, port4, port5, port6, port7, and the order of the ports after ordering is port0, port4, port1, port5, port2, port6, port3, port7, for port1, the index before ordering is 2, and the index after ordering is 3; for port3, the index before ordering is 4, and the index after ordering is 7.

After the ports are reordered, the priorities of the ports after ordering can be calculated. For example, the priorities of the ports can be assigned sequentially according to the order of the ports. In this way, the ports in the first polarization direction and the ports in the second polarization direction are arranged alternately in the priority queue after the ports are ordered according to the priorities.

In this embodiment, the second group not only includes non-zero coefficients of at least one port in the first polarization direction, but also includes non-zero coefficients of at least one port in the second polarization direction. When the channel state information is reported to the network-side device, even if the third group is discarded, the network-side device can still acquire information about ports in the two polarization directions, thus ensuring the precoding effect of the base station.

The value of $m_1$ is agreed in the protocol or configured or pre-configured by the network-side device; and/or the preset ordering method is agreed in the protocol or configured or pre-configured by the network-side device.

In some embodiments, before reporting the channel state information to the network-side device, the method further includes:

acquiring a first port sequence, the first port sequence including a first port set and a second port set, the first port set including M ports corresponding to a first polarization direction, the second port set including N ports corresponding to a second polarization direction, both M and N being positive integers greater than or equal to 2, and the M ports being arranged before the N ports in the first port sequence; and calculating a priority corresponding to each port in the first port sequence, and determining m and n based on the priority, the priority of at least one port of the N ports being higher than the priority of at least one port of the M ports.

In this embodiment, the ports do not need to be reordered, and the priorities of the M ports in the first polarization direction and the N ports in the second polarization direction are directly calculated, so that in the priority queue, the priority of at least one port of the N ports is higher than the priority of at least one port of the M ports.

In some embodiments, the priority of at least one port of the M ports is higher than the priority of at least one port of the N ports.

In this way, the second group not only includes non-zero coefficients of at least one port in the first polarization direction, but also includes non-zero coefficients of at least one port in the second polarization direction. When the channel state information is reported to the network-side device, even if the third group is discarded, the network-side device can still acquire information about ports in the two polarization directions, thus ensuring the precoding effect of the base station.

In a specific example, the calculation parameters for calculating the priorities include $K_1$, v, $m_1$, and $m_2$, where v represents the number of reported layers, $K_1$ is 2*L, L is the number of beams, and $m_2$ is the number of ports in the first polarization direction or the second polarization direction.

In a specific example, the following formula can be used to calculate the priority Pri (l,I,f) of each port:

$$Pri(l, I, f) = K1 * v * \pi(f) + v * \varphi(i) + l$$

$$\pi(f) = 0 \text{ if } f = 0$$

$$\pi(f) = 1 \text{ if } f \neq 0$$

or $$\pi(f) = 0 \text{ if } n_{3,l}^{f} = 0$$

$$\pi(f) = 1 \text{ if } n_{3,l}^{f} \neq 0$$

$$\varphi(i) = \left\lfloor \frac{\text{mod}(i, m_2)}{m_1} \right\rfloor * 2 * m_1 + \left\lfloor \frac{i}{m_2} \right\rfloor * m_1 + \text{mod}(i, m_1)$$

In the priority calculation formula, Pri represents the measure of priority. The smaller the calculated result, the higher the priority. In a case that the calculated result is 0, the priority is the highest. Since there are two polarization directions, $K_1$ is a total number of selected ports.

π(f) represents calculating the priority of FD, and f is the index of the selected FD vector. In the R17 codebook, a maximum of two FD vectors can be selected, so the formula is distinguished by 0 and non-0. In the formula, n3 and if are the serial number of the time domain tap corresponding to the $f^{th}$ FD vector. According to the R17 codebook, there must be one that is 0, and the other may be positive or negative, so they are also distinguished by 0 and non-0.

φ(i) is used for representing a priority relationship between different ports, and can represent a priority relationship between ports in different polarization directions. Mod is a formula for calculating remainder, $\lfloor * \rfloor$ represents rounding down, 1 identifies the index of the layer, and i represents the index of the selected port.

In this embodiment, the priority calculation method is agreed in the protocol or configured or pre-configured by the network-side device.

In some embodiments, the method further includes:

receiving first information from the network-side device, the first information instructing reordering the first port sequence.

In some embodiments, the method further includes:

receiving second information from the network-side device, the second information instructing calculating a priority corresponding to each port in the first port sequence.

In this embodiment of this application, it may be that the network-side device instructs whether to reorder the ports, or whether to calculate the priority of each port according to the above priority calculation method. In a case that the network-side device needs to acquire information about the ports in the two polarization directions, it can transmit first information to the terminal to instruct reordering the ports, or may transmit second information to the terminal to instruct calculating the priorities of the ports according to the above priority calculation method. The first information and/or second information may be contained in CSI configuration (config) or indicated through independent downlink control information (DCI).

In some embodiments of this application, the second part of CSI includes a first group, a second group and a third group, a transmission priority of the first group is higher than a transmission priority of the second group, and the transmission priority of the second group is higher than a transmission priority of the third group; the first group includes a port indicator, the second group includes a frequency domain compression basis FD indicator, an SCI, a polarization amplitude quantization coefficient, an amplitude and phase of non-zero coefficients with a first priority and a bitmap of the non-zero coefficients with the first priority, and the third group includes an amplitude and phase of non-zero coefficients with a second priority and a bitmap of the non-zero coefficients with the second priority. The SCI represents the location of the strongest coefficient of all coefficients. It is not possible to obtain the strongest beam information solely through the port indicator and the SCI. An FD indicator needs to participate together to obtain the strongest beam information. If only the SCI and the port indicator are present in the first group, the SCI is meaningless. Therefore, in this embodiment, the second group carries the FD indicator and the SCI.

In some embodiments of this application, the second part of CSI includes a first group, a second group and a third group, a transmission priority of the first group is higher than a transmission priority of the second group, and the transmission priority of the second group is higher than a transmission priority of the third group; the first group includes a port indicator, an FD indicator and an SCI, the second group includes a polarization amplitude quantization coefficient, an amplitude and phase of non-zero coefficients with a first priority and a bitmap of the non-zero coefficients with the first priority, and the third group includes an amplitude and phase of non-zero coefficients with a second priority and a bitmap of the non-zero coefficients with the second priority. The SCI represents the location of the strongest coefficient of all coefficients. It is not possible to obtain the strongest beam information solely through the port indicator and the SCI. An FD indicator needs to participate together to obtain the strongest beam information. If only the SCI and the port indicator are present in the first group, the SCI is meaningless. Therefore, in this embodiment, the first group carries the port indicator, the FD indicator and the SCI at the same time.

In some embodiments of this application, the second part of CSI includes a first group, a second group and a third group, a transmission priority of the first group is higher than a transmission priority of the second group, and the transmission priority of the second group is higher than a transmission priority of the third group; the first group includes a port indicator, an FD indicator and an SCI, the second group includes an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority. The SCI represents the location of the strongest coefficient of all coefficients. It is not possible to obtain the strongest beam information solely through the port indicator and the SCI. An FD indicator needs to participate together to obtain the strongest beam information. If only the SCI and the port indicator are present in the first group, the SCI is meaningless. Therefore, in this embodiment, the first group carries the port indicator, the FD indicator and the SCI at the same time. In addition, since the non-zero coefficients corresponding to the ports in the second polarization direction are all in the third group and the polarization amplitude quantization coefficient is used for transmitting a second polarization amplitude, the second group does not need this coefficient, so the polarization amplitude quantization coefficient is put in the third group.

In some embodiments of this application, the second part of CSI includes a first group, a second group and a third group, a transmission priority of the first group is higher than a transmission priority of the second group, and the transmission priority of the second group is higher than a transmission priority of the third group; the first group may include a port indicator, the second group may include an FD indicator, an SCI, an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority. In this embodiment, since the non-zero coefficients corresponding to the ports in the second polarization direction are all in the third group and the polarization amplitude quantization coefficient is used for transmitting a second polarization amplitude, the second group does not need this coefficient, so the polarization amplitude quantization coefficient is put in the third group. The SCI represents the location of the strongest coefficient of all coefficients. It is not possible to obtain the strongest beam information solely through the port indicator and the SCI. An FD indicator needs to participate together to obtain the strongest beam information. If only the SCI and the port indicator are present in the first group, the SCI is meaningless. Therefore, in this embodiment, the second group carries the FD indicator and the SCI.

After ports are ordered according to priorities, the non-zero coefficients with the first priority are non-zero coefficients with the highest priority of the N ports; and the non-zero coefficients with the second priority are non-zero coefficients with the lowest priority of P ports, N and P are positive integers, and a sum of N and P is equal to a total number of the ports.

In some embodiments of this application, the second part of CSI may only include a first group and a second group, and does not include a third group, and a transmission priority of the first group is higher than a transmission priority of the second group.

In a specific example, the second group includes a bitmap of all non-zero coefficients, so that the bitmap of all non-zero coefficients can be obtained through the second group without transmitting the third group. In another specific example, the first group includes a port indicator, an FD indicator and an SCI, and the second group includes a polarization amplitude quantization coefficient, an amplitude and phase of all non-zero coefficients and a bitmap of all non-zero coefficients, so that all non-zero coefficients can be obtained through the second group without transmitting the third group.

In some embodiments, the network-side device will configure a number of ports for the terminal. Before reporting the channel state information to the network-side device, the method further includes:

- acquiring the number of ports configured by the network-side device; and
- indicating a number of ports selected for use to the network-side device through the first part in a case that the number of ports selected for use is less than the number of ports configured.

In a case that a number of ports selected by the terminal is less than a number of ports indicated by the network-side device, the terminal directly maps the actual number of ports used in CSI part1. For example, in a case that the network-side device configures the terminal to select 16 ports for reporting, but the terminal finds that the effect of 12 ports is similar to that of 16 ports and decides to use 12 ports for reporting, the terminal directly maps the number of ports used into CSI part1, and the network-side device can know the actual number of ports used by the terminal according to the content of CSI part1. CSI part1 can explicitly or implicitly indicate the number of ports selected by the terminal.

In some embodiments, the network-side device will configure a number of FD for the terminal. Before reporting the channel state information to the network-side device, the method further includes:

- acquiring the number of FD configured by the network-side device; and
- indicating a number of FD selected for use to the network-side device through the first part in a case that the number of FD selected for use is less than the number of FD configured.

In a case that a number of FD selected by the terminal is less than a number of FD indicated by the network-side device, the terminal directly maps the actual number of FD used in CSI part1. For example, in a case that the network-side device configures S1 FD, but the terminal decides to use S2 FD, where S2 is less than S1, the terminal directly maps the number of FD used into CSI part1, and the network-side device can know the actual number of FD used by the terminal according to the content of CSI part1. CSI part1 can explicitly or implicitly indicate the number of FD selected by the terminal.

In some embodiments, when mapping CSI to UCI, in a case that a preset condition is satisfied, the second part does not include at least part of a bitmap of non-zero coefficients, that is, the reporting of at least part of the bitmap can be omitted.

The preset condition includes at least one of the following:

- the total number of the non-zero coefficients is the same as a total size of the bitmap of all layers, indicating that all non-zero coefficients need to be reported; at this time, the bitmap is not needed, and all of the bitmap can be omitted, that is, the second part includes the bitmap of the non-zero coefficients;
- second information from the network-side device is received, and the second information indicates that at least part of the bitmap of the non-zero coefficients does not need to be reported;
- a third parameter configured by the network-side device is received, and the third parameter implicitly indicates that at least part of the bitmap of the non-zero coefficients does not need to be reported;
- elements of the bitmap of the non-zero coefficients are all 1, indicating that all non-zero coefficients need to be reported; at this time, the bitmap is not needed, and all of the bitmap can be omitted, that is, the second part includes the bitmap of the non-zero coefficients; and
- in the PMI, elements of the bitmap of at least part of ranks are all 1, so that the bitmap of this part of ranks can be omitted, for example, the elements of the bitmap of rank3 are all 1, indicating that all non-zero coefficients of rank3 need to be reported, so that the bitmap of rank3 can be omitted.

In addition, the bitmap in the second group can also be omitted, or the bitmap in the third group can also be omitted.

By omitting the reporting of at least part of the bitmap, the resources occupied by the second part can be reduced, thus reducing the signaling overhead.

Figure 3:
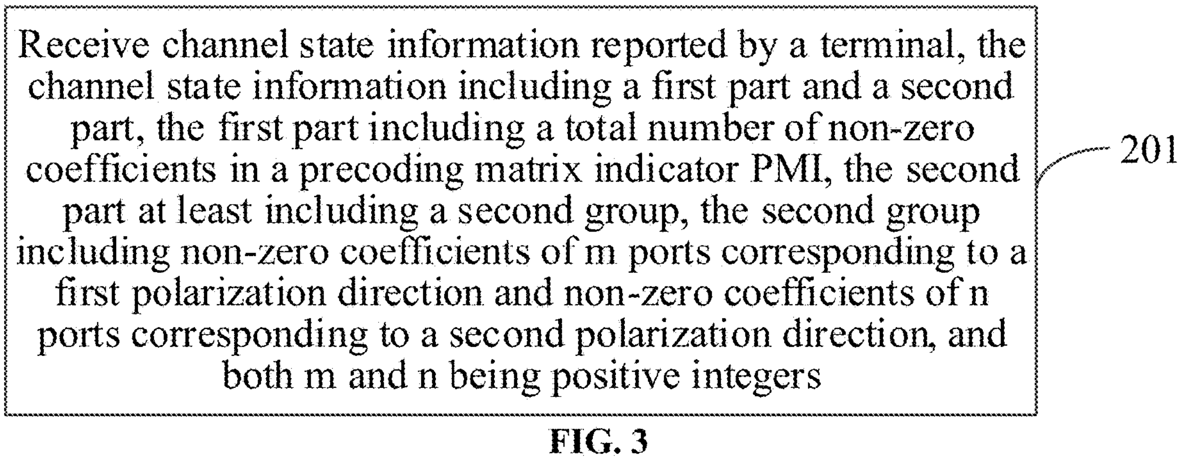
FIG. 3 is a schematic flowchart of a method for transmitting channel state information executed by a network-side device according to an embodiment of this application.

An embodiment of this application further provides a method for transmitting channel state information executed by a network-side device. As shown in FIG. 3, the method includes the following step:

In step 201, channel state information reported by a terminal is received. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers.

In some embodiments, the second part further includes at least one of a first group and a third group, a transmission priority of the first group is higher than a transmission priority of the second group, and the transmission priority of the second group is higher than a transmission priority of the third group;

- the first group includes a port indicator, and the second group includes a frequency domain compression basis FD indicator, an SCI, a polarization amplitude quantization coefficient, an amplitude and phase of non-zero coefficients with a first priority and a bitmap of the non-zero coefficients with the first priority; or
- the first group includes a port indicator, an FD indicator and an SCI, and the second group includes a polarization amplitude quantization coefficient, an amplitude and phase of non-zero coefficients with a first priority and a bitmap of the non-zero coefficients with the first priority; or the first group includes a port indicator, an FD indicator and an SCI, the second group includes an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority; or the first group includes a port indicator, the second group includes an FD indicator, an SCI, an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority.

After ports are ordered according to priorities, the non-zero coefficients with the first priority are non-zero coefficients with the highest priority of the N ports; and the non-zero coefficients with the second priority are non-zero coefficients with the lowest priority of P ports, N and P are positive integers, and a sum of N and P is equal to a total number of the ports.

In some embodiments, the second part further includes a first group;

the second group includes a bitmap of all non-zero coefficients; or the first group includes a port indicator, an FD indicator and an SCI, and the second group includes a polarization amplitude quantization coefficient, an amplitude and phase of all non-zero coefficients and a bitmap of all non-zero coefficients.

It is to be understood that the method for transmitting channel state information provided in this embodiment of this application may be executed by an apparatus for transmitting channel state information, or a module configured to execute the method for transmitting the loaded channel state information in the apparatus for transmitting channel state information. By taking the method in which the apparatus for transmitting channel state information loads the channel state information as an example in this embodiment of this application, the method for transmitting channel state information provided in this embodiment of this application will be described.

Figure 4:
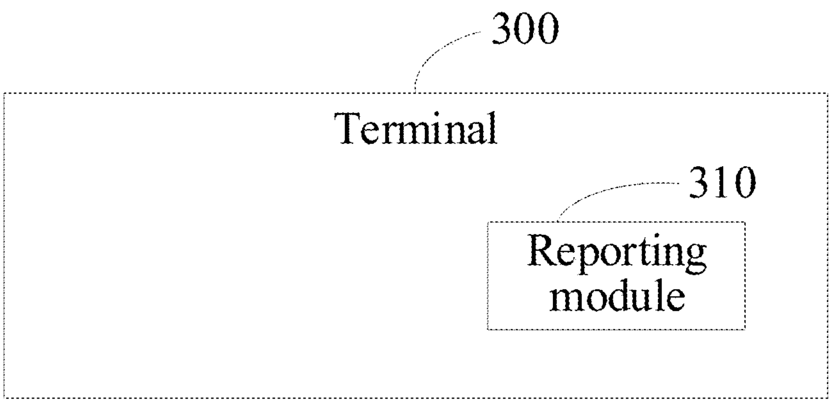
FIG. 4 is a schematic structural diagram of an apparatus for transmitting channel state information applied to a terminal according to an embodiment of this application.

An embodiment of this application provides an apparatus for transmitting channel state information applied to a terminal 300. As shown in FIG. 4, the apparatus includes:

a reporting module 310 configured to report channel state information to a network-side device. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers.

In some embodiments, the apparatus further includes:

a processing module configured to acquire a first port sequence, the first port sequence including a first port set and a second port set, the first port set including M ports corresponding to a first polarization direction, the second port set including N ports corresponding to a second polarization direction, both M and N being positive integers greater than or equal to 2, and the M ports being arranged before the N ports in the first port sequence; reorder the first port sequence to obtain a second port sequence, where at least one of the N ports is arranged at first M bits of the second port sequence; and determine m and n based on the second port sequence, M being greater than or equal to m, and N being greater than or equal to n.

In some embodiments, the first port set includes X port bundles, each port bundle of the X port bundles includes at least one port corresponding to the first polarization direction, and X is an integer less than or equal to M and greater than or equal to 2; the second port set includes Y port bundles, each port bundle of the Y port bundles includes at least one port corresponding to the second polarization direction, and Y is an integer less than or equal to N and greater than or equal to 2; and the X port bundles and the Y port bundles are arranged alternately in the second port sequence.

In some embodiments, at least one of the M ports is arranged before at least one of the N ports.

In some embodiments, the apparatus further includes:

a processing module configured to acquire a first port sequence, the first port sequence including a first port set and a second port set, the first port set including M ports corresponding to a first polarization direction, the second port set including N ports corresponding to a second polarization direction, both M and N being positive integers greater than or equal to 2, and the M ports being arranged before the N ports in the first port sequence; and calculate a priority corresponding to each port in the first port sequence, and determine m and n based on the priority, the priority of at least one port of the N ports being higher than the priority of at least one port of the M ports.

In some embodiments, the priority of at least one port of the M ports is higher than the priority of at least one port of the N ports.

In some embodiments, the apparatus further includes:

a receiving module configured to receive first information from the network-side device, the first information instructing reordering the first port sequence.

In some embodiments, the apparatus further includes:

a receiving module configured to receive second information from the network-side device, the second information instructing calculating a priority corresponding to each port in the first port sequence.

In some embodiments, the second part further includes at least one of a first group and a third group, a transmission priority of the first group is higher than a transmission priority of the second group, and the transmission priority of the second group is higher than a transmission priority of the third group;

the first group includes a port indicator, and the second group includes a frequency domain compression basis FD indicator, an SCI, a polarization amplitude quantization coefficient, an amplitude and phase of non-zero coefficients with a first priority and a bitmap of the non-zero coefficients with the first priority; or the first group includes a port indicator, an FD indicator and an SCI, and the second group includes a polarization amplitude quantization coefficient, an amplitude and phase of non-zero coefficients with a first priority and a bitmap of the non-zero coefficients with the first priority; or the first group includes a port indicator, an FD indicator and an SCI, the second group includes an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority; or the first group includes a port indicator, the second group includes an FD indicator, an SCI, an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority.

After ports are ordered according to priorities, the non-zero coefficients with the first priority are non-zero coefficients with the highest priority of the N ports; and the non-zero coefficients with the second priority are non-zero coefficients with the lowest priority of P ports, N and P are positive integers, and a sum of N and P is equal to a total number of the ports.

In some embodiments, the second part further includes a first group;

the second group includes a bitmap of all non-zero coefficients; or the first group includes a port indicator, an FD indicator and an SCI, and the second group includes a polarization amplitude quantization coefficient, an amplitude and phase of all non-zero coefficients and a bitmap of all non-zero coefficients.

In some embodiments, the apparatus further includes:

an acquisition module configured to acquire a number of ports configured by the network-side device; and the reporting module is further configured to indicate a number of ports selected for use to the network-side device through the first part in a case that the number of ports selected for use is less than the number of ports configured.

In some embodiments, the apparatus further includes:

an acquisition module configured to acquire a number of FD configured by the network-side device; and the reporting module is further configured to indicate a number of FD selected for use to the network-side device through the first part in a case that the number of FD selected for use is less than the number of FD configured.

In some embodiments, in a case that a preset condition is satisfied, the second part does not include at least part of the bitmap of the non-zero coefficients.

The preset condition includes at least one of the following:

the total number of the non-zero coefficients is the same as a total size of a bitmap of all layers;

second information from the network-side device is received;

a third parameter configured by the network-side device is received;

elements of the bitmap of the non-zero coefficients are all 1; and elements of a bitmap of at least part of ranks in the PMI are all 1.

In some embodiments, the second part does not include all of the bitmap of the non-zero coefficients in a case that the total number of the non-zero coefficients is the same as the total size of a bitmap of all layers, or the elements of the bitmap of the non-zero coefficients are all 1; and the second part does not include a bitmap of a first layer in a case that elements of the bitmap of the first layer in the PMI are all 1.

The apparatus for transmitting channel state information in this embodiment of this application may be an apparatus, an apparatus with an operating system or an electronic device, or a component, an integrated circuit, or a chip in a terminal. The apparatus or electronic device may be a mobile terminal or a non-mobile terminal. Exemplarily, the mobile terminal may include but is not limited to the types of terminal 11 listed above, and the non-mobile terminal may include a server, a network attached storage (NAS), a personal computer (PC), a television (TV), an ATM, or a self-service machine, which are not specifically limited in this embodiment of this application.

The apparatus for transmitting channel state information provided in this embodiment of this application can implement the various processes implemented in the method embodiment illustrated in FIG. 2 and achieve the same technical effect, which will not be repeated here in order to avoid repetition.

Figure 5:
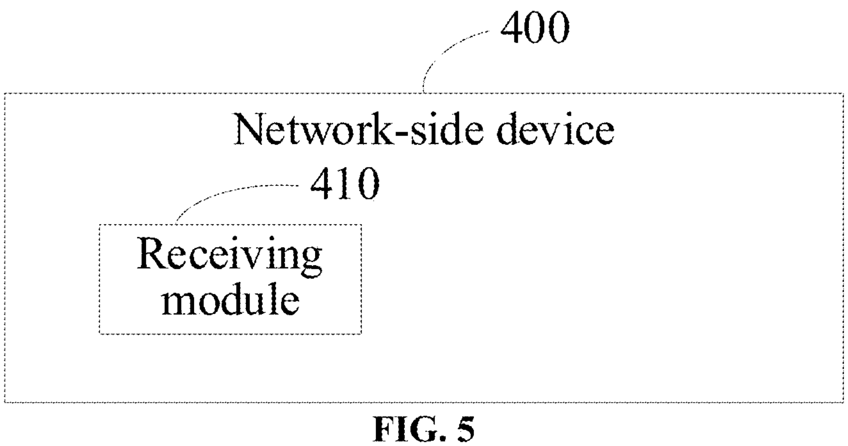
FIG. 5 is a schematic structural diagram of an apparatus for transmitting channel state information applied to a network-side device according to an embodiment of this application.

An embodiment of this application provides an apparatus for transmitting channel state information applied to a network-side device 400. As shown in FIG. 5, the apparatus includes:

a receiving module 410 configured to receive channel state information reported by a terminal. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers.

In some embodiments, the second part further includes at least one of a first group and a third group, a transmission priority of the first group is higher than a transmission priority of the second group, and the transmission priority of the second group is higher than a transmission priority of the third group;

the first group includes a port indicator, and the second group includes a frequency domain compression basis FD indicator, an SCI, a polarization amplitude quantization coefficient, an amplitude and phase of non-zero coefficients with a first priority and a bitmap of the non-zero coefficients with the first priority; or the first group includes a port indicator, an FD indicator and an SCI, and the second group includes a polarization amplitude quantization coefficient, an amplitude and phase of non-zero coefficients with a first priority and a bitmap of the non-zero coefficients with the first priority; or the first group includes a port indicator, an FD indicator and an SCI, the second group includes an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority; or the first group includes a port indicator, the second group includes an FD indicator, an SCI, an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority.

After ports are ordered according to priorities, the non-zero coefficients with the first priority are non-zero coefficients with the highest priority of the N ports; and the non-zero coefficients with the second priority are non-zero coefficients with the lowest priority of P ports, N and P are positive integers, and a sum of N and P is equal to a total number of the ports.

In some embodiments, the second part further includes a first group;

the second group includes a bitmap of all non-zero coefficients; or the first group includes a port indicator, an FD indicator and an SCI, and the second group includes a polarization amplitude quantization coefficient, an amplitude and phase of all non-zero coefficients and a bitmap of all non-zero coefficients.

The apparatus for transmitting channel state information provided in this embodiment of this application can implement the various processes implemented in the method embodiment illustrated in FIG. 3 and achieve the same technical effect, which will not be repeated here in order to avoid repetition.

Figure 6:
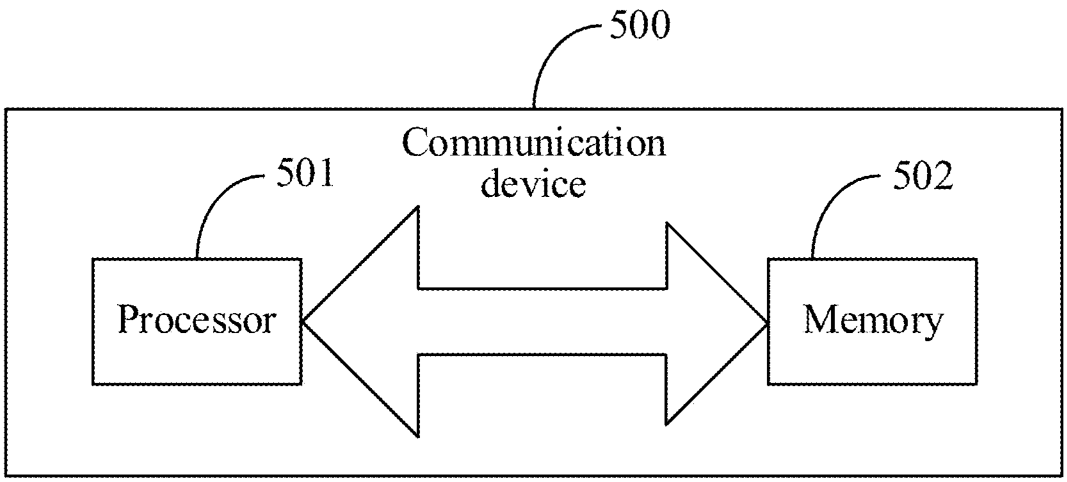
FIG. 6 is a schematic diagram of components of a communication device according to an embodiment of this application.

Optionally, as shown in FIG. 6, an embodiment of this application further provides a communication device 500, which includes a processor 501 and a memory 502. A program or instruction is stored on the memory 502 and runnable on the processor 501. For example, in a case that the communication device 500 is a terminal, the program or instruction, when executed by the processor 501, implements the various processes of the embodiment of the method for transmitting channel state information applied to the terminal, and can achieve the same technical effect. In a case that the communication device 500 is a network-side device, the program or instruction, when executed by the processor 501, implements the various processes of the embodiment of the method for transmitting channel state information applied to the network-side device, and can achieve the same technical effect, which will not be repeated here in order to avoid repetition.

Figure 7:
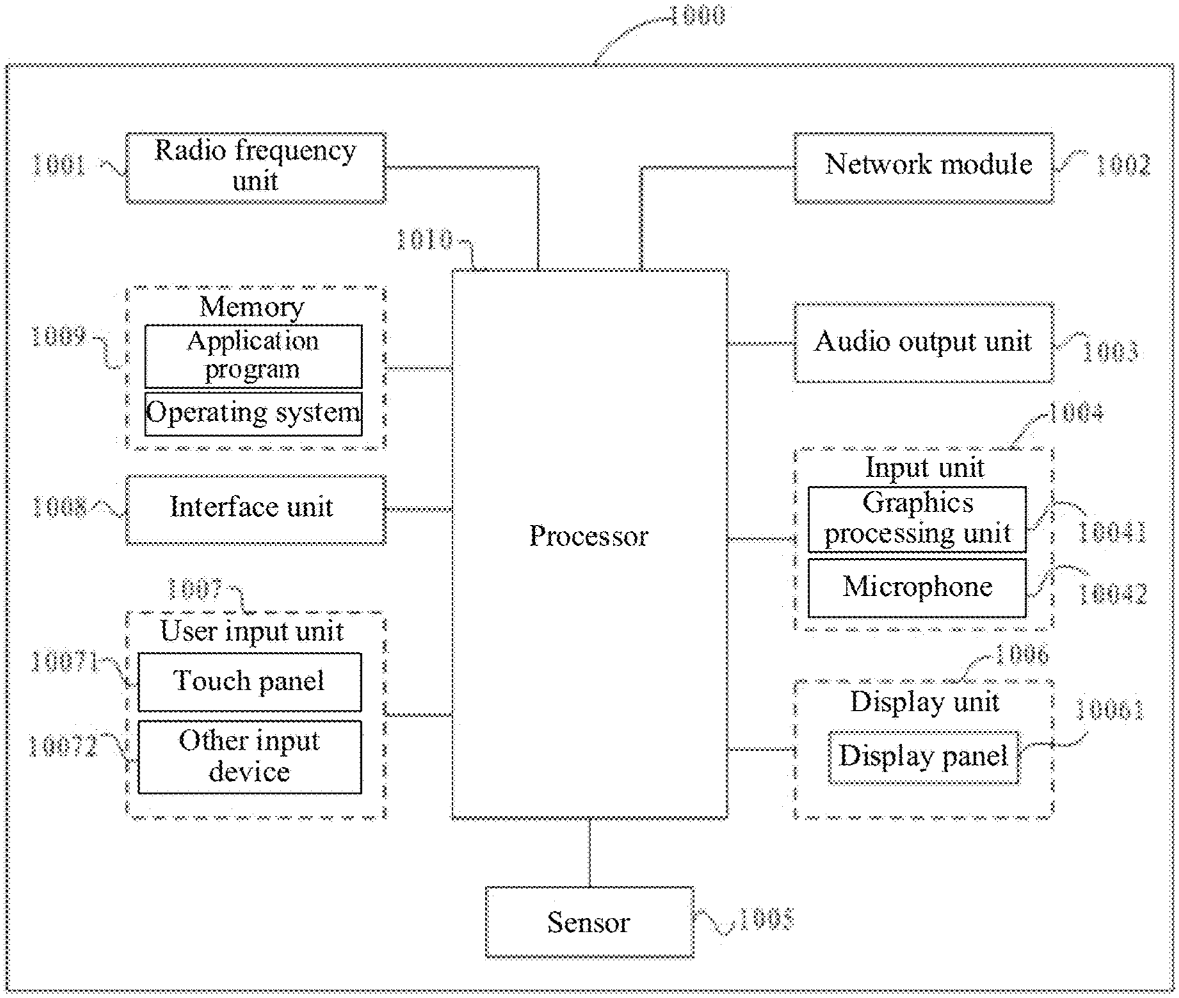
FIG. 7 is a schematic diagram of components of a terminal according to an embodiment of this application.

An embodiment of this application further provides a terminal, including a processor and a communication interface. The processor is configured to report channel state information to a network-side device. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers. This terminal embodiment corresponds to the above terminal-side method embodiment. The various implementation processes and modes in the above method embodiments are applicable to this terminal embodiment, and can achieve the same technical effect. Specifically, FIG. 7 is a schematic diagram of a hardware structure of a terminal according to an embodiment of this application.

The terminal 1000 includes but not limited to, at least part of components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

It can be understood by those skilled in the art that the terminal 1000 may further include a power supply (such as a battery) for supplying power to the components. The power supply may be logically connected to the processor 1010 by a power supply management system, thus implementing functions such as charging, discharging, and power consumption management by using the power supply management system. The terminal structure illustrated in FIG. 7 constitutes no limitation on the terminal, and the terminal may include more or fewer components than those illustrated therein, or some components may be combined, or a different component deployment may be used, which will not be repeated here.

It is to be understood that in this embodiment of this application, the input unit 1004 may include a graphics processing unit (GPU) 10041 and a microphone 10042. The graphics processing unit 10041 performs processing on image data of a static picture or a video that is obtained by an image acquisition apparatus (for example, a camera) in a video acquisition mode or an image acquisition mode. The display unit 1006 may include a display panel 10061. The display panel 10061 may be configured in the form of liquid crystal display, organic light emitting diode, or the like. The user input unit 1007 includes a touch panel 10071 and an other input device 10072. The touch panel 10071 is also known as touch screen. The touch panel 10071 may include two parts, namely a touch detection apparatus and a touch controller. The other input device 10072 may include, but not limited to, a physical keyboard, a functional key (such as a volume control key or a switch key), a track ball, a mouse, and a joystick, which are not repeated here.

In this embodiment of this application, the radio frequency unit 1001 receives downlink data from the network-side device and transmits it to the processor 1010 for processing. In addition, uplink data is transmitted to the network-side device. Generally, the radio frequency unit 1001 includes, but not limited to, an antenna, at least one amplifier, a transceiver, a coupler, a low noise amplifier, a duplexer, or the like.

The memory 1009 may be configured to store a software program or instruction and various data. The memory 1009 may mainly include a program or instruction storage area and a data storage area. The program or instruction storage area may store an operating system, an application program or instruction required by at least one function (for example, a sound playback function or an image display function), and the like. In addition, the memory 1009 may include a high-speed random access memory or a non-volatile memory. The non-volatile memory may be a read-only memory (ROM), a programmable ROM (Programmable ROM, PROM), an erasable PROM (Erasable PROM, EPROM), an electrically EPROM (Electrically EPROM, EEPROM), or a flash memory. For example, it may be at least one disk storage device, flash memory device, or other non-volatile solid-state storage device.

The processor 1010 may include one or more processing units. Optionally, the processor 1010 may integrate an application processor and a modem processor. The application processor mainly processes an operating system, a user interface, an application program or instruction, and the like. The modem processor mainly processes wireless communication, such as a baseband processor. It is to be understood that the foregoing modem processor may not be integrated into the processor 1010.

The processor 1010 is configured to report channel state information to a network-side device. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers.

In some embodiments, the processor 1010 is configured to acquire a first port sequence, the first port sequence including a first port set and a second port set, the first port set including M ports corresponding to a first polarization direction, the second port set including N ports corresponding to a second polarization direction, both M and N being positive integers greater than or equal to 2, and the M ports being arranged before the N ports in the first port sequence;

reorder the first port sequence to obtain a second port sequence, where at least one of the N ports is arranged at first M bits of the second port sequence; and determine m and n based on the second port sequence, M being greater than or equal to m, and N being greater than or equal to n.

In some embodiments, the first port set includes X port bundles, each port bundle of the X port bundles includes at least one port corresponding to the first polarization direction, and X is an integer less than or equal to M and greater than or equal to 2; the second port set includes Y port bundles, each port bundle of the Y port bundles includes at least one port corresponding to the second polarization direction, and Y is an integer less than or equal to N and greater than or equal to 2; and the X port bundles and the Y port bundles are arranged alternately in the second port sequence.

In some embodiments, at least one of the M ports is arranged before at least one of the N ports.

In some embodiments, the processor 1010 is configured to acquire a first port sequence, the first port sequence including a first port set and a second port set, the first port set including M ports corresponding to a first polarization direction, the second port set including N ports corresponding to a second polarization direction, both M and N being positive integers greater than or equal to 2, and the M ports being arranged before the N ports in the first port sequence; and calculate a priority corresponding to each port in the first port sequence, and determine m and n based on the priority, the priority of at least one port of the N ports being higher than the priority of at least one port of the M ports.

In some embodiments, the priority of at least one port of the M ports is higher than the priority of at least one port of the N ports.

In some embodiments, the processor 1010 is configured to receive first information from the network-side device. The first information instructs reordering the first port sequence.

In some embodiments, the processor 1010 is configured to receive second information from the network-side device. The second information instructs calculating a priority corresponding to each port in the first port sequence.

In some embodiments, the second part further includes at least one of a first group and a third group, a transmission priority of the first group is higher than a transmission priority of the second group, and the transmission priority of the second group is higher than a transmission priority of the third group;

the first group includes a port indicator, and the second group includes a frequency domain compression basis FD indicator, an SCI, a polarization amplitude quantization coefficient, an amplitude and phase of non-zero coefficients with a first priority and a bitmap of the non-zero coefficients with the first priority; or the first group includes a port indicator, an FD indicator and an SCI, and the second group includes a polarization amplitude quantization coefficient, an amplitude and phase of non-zero coefficients with a first priority and a bitmap of the non-zero coefficients with the first priority; or the first group includes a port indicator, an FD indicator and an SCI, the second group includes an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority; or the first group includes a port indicator, the second group includes an FD indicator, an SCI, an amplitude and phase of non-zero coefficients with a first priority and a bitmap of the non-zero coefficients with the first priority, and the third group includes a polarization amplitude quantization coefficient, an amplitude and phase of non-zero coefficients with a second priority and a bitmap of the non-zero coefficients with the second priority.

After ports are ordered according to priorities, the non-zero coefficients with the first priority are non-zero coefficients with the highest priority of the N ports; and the non-zero coefficients with the second priority are non-zero coefficients with the lowest priority of P ports, N and P are positive integers, and a sum of N and P is equal to a total number of the ports.

In some embodiments, the second part further includes a first group;

the second group includes a bitmap of all non-zero coefficients; or the first group includes a port indicator, an FD indicator and an SCI, and the second group includes a polarization amplitude quantization coefficient, an amplitude and phase of all non-zero coefficients and a bitmap of all non-zero coefficients.

In some embodiments, the processor 1010 is configured to acquire a number of ports configured by the network-side device; and indicate a number of ports selected for use to the network-side device through the first part in a case that the number of ports selected for use is less than the number of ports configured.

In some embodiments, the processor 1010 is configured to acquire a number of FD configured by the network-side device; and indicate a number of FD selected for use to the network-side device through the first part in a case that the number of FD selected for use is less than the number of FD configured.

In some embodiments, in a case that a preset condition is satisfied, the second part does not include at least part of the bitmap of the non-zero coefficients.

The preset condition includes at least one of the following:

the total number of the non-zero coefficients is the same as a total size of a bitmap of all layers;

second information from the network-side device is received;

a third parameter configured by the network-side device is received;

elements of the bitmap of the non-zero coefficients are all 1; and elements of a bitmap of at least part of ranks in the PMI are all 1.

In some embodiments, the second part does not include all of the bitmap of the non-zero coefficients in a case that the total number of the non-zero coefficients is the same as the total size of a bitmap of all layers, or the elements of the bitmap of the non-zero coefficients are all 1; and the second part does not include a bitmap of a first layer in a case that elements of the bitmap of the first layer in the PMI are all 1.

An embodiment of this application further provides a network-side device, including a processor and a communication interface. The communication interface is configured to receive channel state information reported by a terminal. The channel state information includes a first part and a second part. The first part includes a total number of non-zero coefficients in a precoding matrix indicator PMI. The second part at least includes a second group. The second group includes non-zero coefficients of m ports corresponding to a first polarization direction and non-zero coefficients of n ports corresponding to a second polarization direction. Both m and n are positive integers. This network-side device embodiment corresponds to the above network-side device method embodiment. The various implementation processes and modes in the above method embodiment are applicable to this network-side device embodiment, and can achieve the same technical effect.

Figure 8:
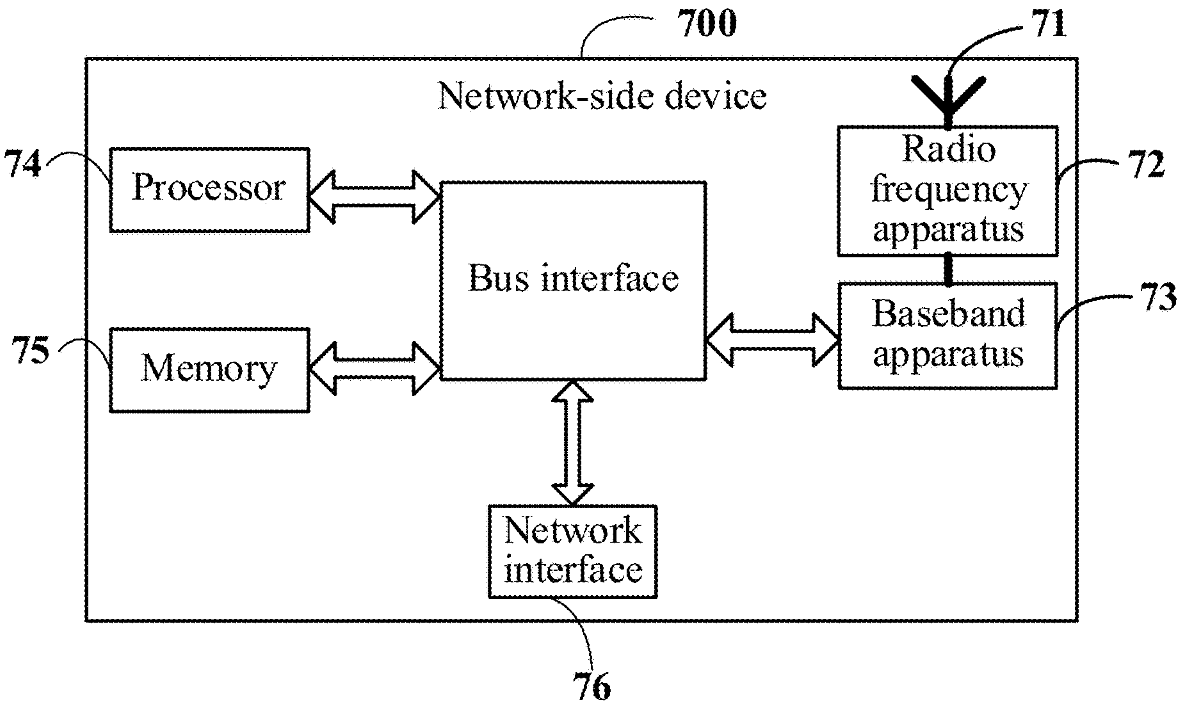
FIG. 8 is a schematic diagram of components of a network-side device according to an embodiment of this application.

Specifically, an embodiment of this application further provides a network-side device. As shown in FIG. 8, a network-side device 700 includes: an antenna 71, a radio frequency apparatus 72, and a baseband apparatus 73. The antenna 71 is connected with the radio frequency apparatus 72. In the uplink direction, the radio frequency apparatus 72 receives information through the antenna 71 and transmits the received information to the baseband apparatus 73 for processing. In the downlink direction, the baseband apparatus 73 processes information to be transmitted and transmits it to the radio frequency apparatus 72. The radio frequency apparatus 72 processes the received information and transmits it through the antenna 71.

The frequency band processing apparatus may be located in the baseband apparatus 73. The method executed by the network-side device in the above embodiment can be implemented in the baseband apparatus 73. The baseband apparatus 73 includes a processor 74 and a memory 75.

The baseband apparatus 73 may include, for example, at least one baseband board. A plurality of chips are provided on the baseband board. As shown in FIG. 8, one chip, for example, is the processor 74 connected with the memory 75 and configured to call a program in the memory 75 and perform operations on the network-side device illustrated in the method embodiment.

The baseband apparatus 73 may further include a network interface 76 configured to exchange information with the radio frequency apparatus 72. The interface is, for example, a common public radio interface (CPRI for short).

Specifically, the network-side device further includes: an instruction or program stored in the memory 75 and runnable on the processor 74. The processor 74 calls the instruction or program in the memory 75 to implement the method implemented by each module illustrated in FIG. 5 and achieve the same technical effect, which will not be repeated here in order to avoid repetition.

An embodiment of this application further provides a readable storage medium. A program or instruction is stored on the readable storage medium. The program or instruction, when executed by the processor, implements the various processes of the embodiment of the method for transmitting channel state information, and can achieve the same technical effect, which will not be repeated here in order to avoid repetition.

The processor is a processor in the terminal in the above embodiment. The readable storage medium includes a computer-readable storage medium, such as a read-only memory (ROM), a random access memory (RAM), a magnetic disk, an optical disc, or the like.

An embodiment of this application further provides a chip. The chip includes a processor and a communication interface coupled to the processor. The processor is configured to run a program or instruction to implement the various processes of the embodiment of the method for transmitting channel state information, and can achieve the same technical effect, which will not be repeated here in order to avoid repetition.

It is to be understood that the chip provided in this embodiment of this application may also be referred to as a system-on-chip, a system chip, a chip system, a system-on-a-chip, or the like.

It is to be understood that the terms "include", "comprise", or any other variation thereof in the description are intended to cover a non-exclusive inclusion, such that processes, methods, objects, or apparatuses, that includes a series of elements not only includes those elements, but also includes other elements that are not explicitly listed, or also includes elements inherent to such processes, methods, objects, or apparatuses. Without further limitations, the element limited by the statement "including a . . . " does not exclude the existence of another identical element in a process, method, item or device that includes that element. In addition, it should be pointed out that the scope of the methods and apparatuses in the embodiments of this application is not limited to performing functions in the order shown or discussed, but may also include performing functions in a substantially simultaneous manner or in the opposite order according to the involved functions. For example, the described methods may be executed in a different order from the described ones, and various steps may also be added, omitted or combined. In addition, features described with reference to certain examples may be combined in other examples.

Through the description of the above embodiments, those skilled in the art can clearly understand that the above embodiment method may be implemented through software and necessary universal hardware platforms. Of course, they may also be implemented through hardware. However, in many cases, the former is the preferred embodiment. Based on this understanding, the technical solution of this application, or the part that contributes to the existing technology, may be reflected in the form of a software product, which is stored in a storage medium (such as ROM/RAM, magnetic disc or optical disc), including several instructions to enable a terminal (which may be a mobile phone, a computer, a server, an air conditioner or a network-side device) to execute the methods described in the embodiments of this application.

The embodiments of this application have been described above with reference to the drawings. However, this application is not limited to the specific embodiments above. The specific embodiments above are only exemplary rather than restrictive. Under the inspiration of this application, those skilled in the art may make many variations without departing from the essence and the scope of protection of this application, which, however, still fall within the scope of protection of this application.

What is claimed is:

1. A method for transmitting channel state information executed by a terminal, comprising:

reporting channel state information to a network-side device, the channel state information comprising a first part and a second part, the first part comprising a total number of non-zero coefficients in a precoding matrix indicator (PMI), the second part at least comprising a second group, and the second group comprising a polarization amplitude quantization coefficient, an amplitude and phase of the non-zero coefficients and a bitmap of the non-zero coefficients;

wherein the second part further comprises at least one of a first group or a third group, a transmission priority of the first group is higher than a transmission priority of the second group, and the transmission priority of the second group is higher than a transmission priority of the third group;

the first group comprises a port indicator, an FD indicator and an SCI, and the second group comprises the polarization amplitude quantization coefficient, an amplitude and phase of non-zero coefficients with a first priority and a bitmap of the non-zero coefficients with the first priority; or the first group comprises a port indicator, an FD indicator and an SCI, the second group comprises the polarization amplitude quantization coefficient, an amplitude and phase of non-zero coefficients with a first priority and a bitmap of the non-zero coefficients with the first priority, and the third group comprises an amplitude and phase of non-zero coefficients with a second priority and a bitmap of the non-zero coefficients with the second priority.

2. The method for transmitting channel state information according to claim 1, wherein before reporting the channel state information to the network-side device, the method further comprises:

acquiring a first port sequence, the first port sequence comprising a first port set and a second port set, the first port set comprising M ports corresponding to a first polarization direction, the second port set comprising N ports corresponding to a second polarization direction, both M and N being positive integers greater than or equal to 2, and the M ports being arranged before the N ports in the first port sequence;

reordering the first port sequence to obtain a second port sequence, wherein at least one of the N ports is arranged at first M bits of the second port sequence; and determining m and n based on the second port sequence, M being greater than or equal to m, and N being greater than or equal to n.

3. The method for transmitting channel state information according to claim 2, wherein the first port set comprises X port bundles, each port bundle of the X port bundles comprises at least one port corresponding to the first polarization direction, and X is an integer less than or equal to M and greater than or equal to 2; the second port set comprises Y port bundles, each port bundle of the Y port bundles comprises at least one port corresponding to the second polarization direction, and Y is an integer less than or equal to N and greater than or equal to 2; and the X port bundles and the Y port bundles are arranged alternately in the second port sequence.

4. The method for transmitting channel state information according to claim 2, wherein at least one port of the M ports is arranged before at least one port of the N ports.

5. The method for transmitting channel state information according to claim 1, wherein before reporting the channel state information to the network-side device, the method further comprises:

acquiring a first port sequence, the first port sequence comprising a first port set and a second port set, the first port set comprising M ports corresponding to a first polarization direction, the second port set comprising N ports corresponding to a second polarization direction, both M and N being positive integers greater than or equal to 2, and the M ports being arranged before the N ports in the first port sequence; and calculating a priority corresponding to each port in the first port sequence, and determining m and n based on the priority, the priority of at least one port of the N ports being higher than the priority of at least one port of the M ports.

6. The method for transmitting channel state information according to claim 5, wherein the priority of at least one port of the M ports is higher than the priority of at least one port of the N ports.

7. The method for transmitting channel state information according to claim 2, wherein the method further comprises:

receiving first information from the network-side device, the first information instructing reordering the first port sequence.

8. The method for transmitting channel state information according to claim 1, wherein the second group comprises non-zero coefficients of m ports corresponding to a first polarization direction and non-zero coefficients of n ports corresponding to a second polarization direction, and both m and n are positive integers.

9. The method for transmitting channel state information according to claim 1, wherein the second part does not comprise at least part of the bitmap of the non-zero coefficients in a case that a preset condition is satisfied;

the preset condition comprising at least one of the following:

the total number of the non-zero coefficients being the same as a total size of a bitmap of all layers;

second information from the network-side device being received;

a third parameter configured by the network-side device being received;

elements of the bitmap of the non-zero coefficients being all 1; or elements of a bitmap of at least part of ranks in the PMI being all 1.

10. The method for transmitting channel state information according to claim 9, wherein the second part does not comprise all of the bitmap of the non-zero coefficients in a case that the total number of the non-zero coefficients is the same as the total size of a bitmap of all layers, or the elements of the bitmap of the non-zero coefficients are all 1; and the second part does not comprise a bitmap of a first layer in a case that elements of the bitmap of the first layer in the PMI are all 1.

11. A method for transmitting channel state information executed by a network-side device, comprising:

receiving channel state information reported by a terminal, the channel state information comprising a first part and a second part, the first part comprising a total number of non-zero coefficients in a precoding matrix indicator (PMI), the second part at least comprising a second group, and the second group comprising a polarization amplitude quantization coefficient, an amplitude and phase of the non-zero coefficients and a bitmap of the non-zero coefficients;

wherein the second part further comprises at least one of a first group or a third group, a transmission priority of the first group is higher than a transmission priority of the second group, and the transmission priority of the second group is higher than a transmission priority of the third group;

the first group comprises a port indicator, an FD indicator and an SCI, and the second group comprises the polarization amplitude quantization coefficient, an amplitude and phase of non-zero coefficients with a first priority and a bitmap of the non-zero coefficients with the first priority; or the first group comprises a port indicator, an FD indicator and an SCI, the second group comprises the polarization amplitude quantization coefficient, an amplitude and phase of non-zero coefficients with a first priority and a bitmap of the non-zero coefficients with the first priority, and the third group comprises an amplitude and phase of non-zero coefficients with a second priority and a bitmap of the non-zero coefficients with the second priority.

12. The method for transmitting channel state information according to claim 11, wherein the second group comprises non-zero coefficients of m ports corresponding to a first polarization direction and non-zero coefficients of n ports corresponding to a second polarization direction, and both m and n are positive integers.

13. A terminal, comprising a processor, a memory, and a program or instruction stored in the memory and runnable on the processor, wherein the program or instruction is executed by the processor, and causes the terminal to perform:

reporting channel state information to a network-side device, the channel state information comprising a first part and a second part, the first part comprising a total number of non-zero coefficients in a precoding matrix indicator (PMI), the second part at least comprising a second group, and the second group comprising a polarization amplitude quantization coefficient, an amplitude and phase of the non-zero coefficients and a bitmap of the non-zero coefficients;

wherein the second part further comprises at least one of a first group or a third group, a transmission priority of the first group is higher than a transmission priority of the second group, and the transmission priority of the second group is higher than a transmission priority of the third group;

the first group comprises a port indicator, an FD indicator and an SCI, and the second group comprises the polarization amplitude quantization coefficient, an amplitude and phase of non-zero coefficients with a first priority and a bitmap of the non-zero coefficients with the first priority; or the first group comprises a port indicator, an FD indicator and an SCI, the second group comprises the polarization amplitude quantization coefficient, an amplitude and phase of non-zero coefficients with a first priority and a bitmap of the non-zero coefficients with the first priority, and the third group comprises an amplitude and phase of non-zero coefficients with a second priority and a bitmap of the non-zero coefficients with the second priority.

14. The terminal according to claim 13, wherein the second part further comprises at least one of a first group or a third group, a transmission priority of the first group is higher than a transmission priority of the second group, and the transmission priority of the second group is higher than a transmission priority of the third group;

the first group comprises a port indicator, an FD indicator and an SCI, and the second group comprises the polarization amplitude quantization coefficient, an amplitude and phase of non-zero coefficients with a first priority and a bitmap of the non-zero coefficients with the first priority; or the first group comprises a port indicator, an FD indicator and an SCI, the second group comprises the polarization amplitude quantization coefficient, an amplitude and phase of non-zero coefficients with a first priority and a bitmap of the non-zero coefficients with the first priority, and the third group comprises an amplitude and phase of non-zero coefficients with a second priority and a bitmap of the non-zero coefficients with the second priority;

wherein after ports are ordered according to priorities, the non-zero coefficients with the first priority are non-zero coefficients with the highest priority of N ports; and the non-zero coefficients with the second priority are non-zero coefficients with the lowest priority of P ports, N and P are positive integers, and a sum of N and P is equal to a total number of the ports.

15. The terminal according to claim 13, wherein the second part does not comprise at least part of the bitmap of the non-zero coefficients in a case that a preset condition is satisfied;

the preset condition comprising at least one of the following:

the total number of the non-zero coefficients being the same as a total size of a bitmap of all layers;

second information from the network-side device being received;

a third parameter configured by the network-side device being received;

elements of the bitmap of the non-zero coefficients being all 1; or elements of a bitmap of at least part of ranks in the PMI being all 1.

16. The terminal according to claim 15, wherein the second part does not comprise all of the bitmap of the non-zero coefficients in a case that the total number of the non-zero coefficients is the same as the total size of a bitmap of all layers, or the elements of the bitmap of the non-zero coefficients are all 1; and the second part does not comprise a bitmap of a first layer in a case that elements of the bitmap of the first layer in the PMI are all 1.

17. A network-side device, comprising a processor, a memory, and a program or instruction stored in the memory and runnable on the processor, wherein the program or instruction is executed by the processor, and implements steps of the method for transmitting channel state information according to claim 11.

* * * * *